UNITED STATES PATENT OFFICE.

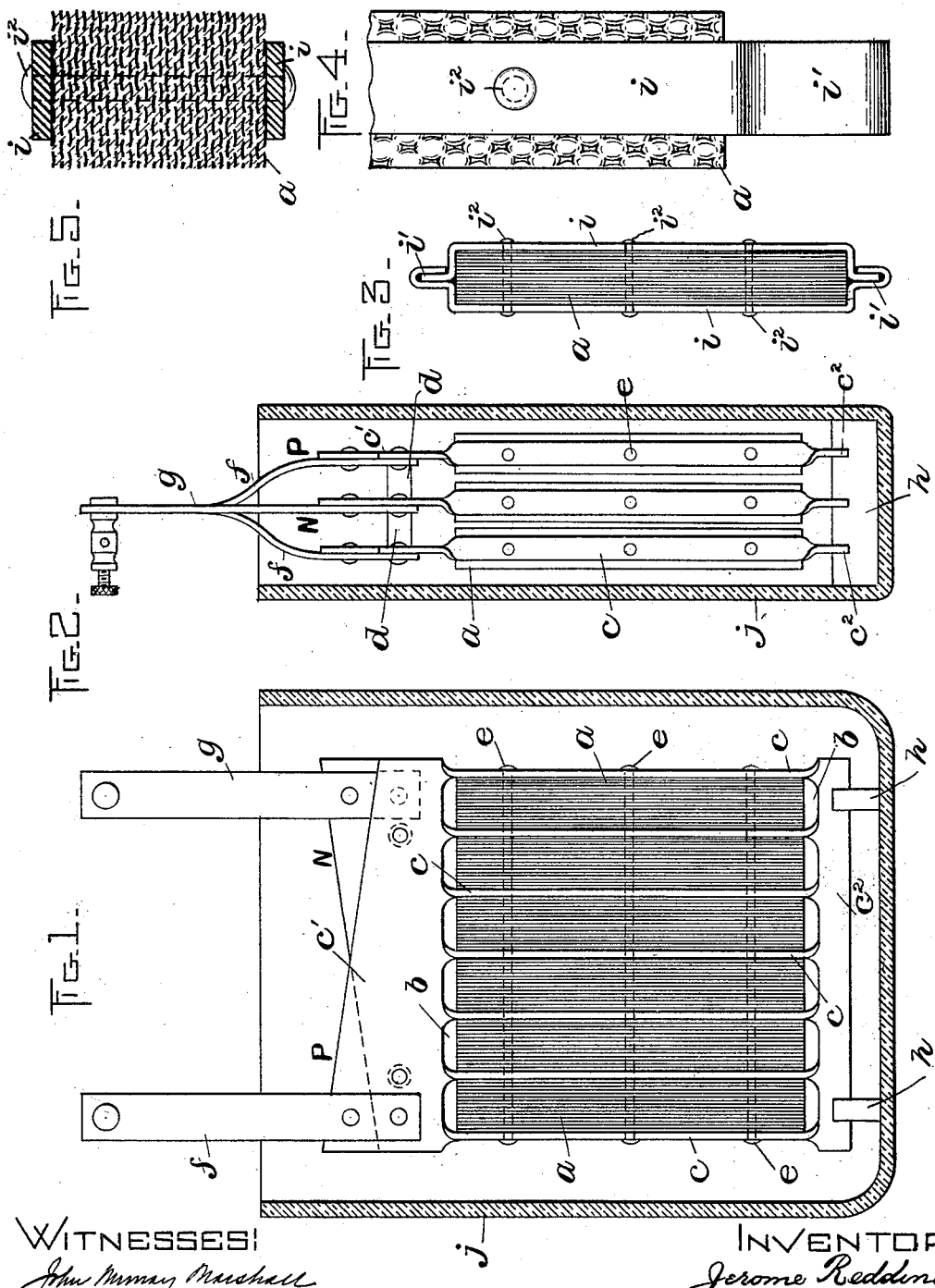

JEROME REDDING, OF BOSTON, MASSACHUSETTS, ASSIGNOR OF TWO-THIRDS TO ISAAC WILLIAM DEERING AND LLEWELLYN D. LOTHROP, OF GLOUCESTER, MASSACHUSETTS.

STORAGE BATTERY.

SPECIFICATION forming part of Letters Patent No. 699,413, dated May 6, 1902.

Application filed August 5, 1901. Serial No. 70,882. (No model.)

*To all whom it may concern:*

Be it known that I, JEROME REDDING, of Boston, in the county of Suffolk and State of Massachusetts, have invented certain new and useful Improvements in Storage Batteries, of which the following is a description sufficiently full, clear, and exact to enable those skilled in the art to which it appertains or with which it is most nearly connected to make and use the same.

The general object of the present invention is to so improve the construction of storage batteries as to increase capacity for charge without increasing size and to permit rapid charging without derangement of formative structure.

More specifically stated, the object of the invention is to provide an improved construction of lead elements for storage batteries whereby the lead may be brought as nearly as practicable to a molecularly subdivided state and active material employed in conjunction with the lead may find lodgment on the greatest possible area of lead surface in such manner as to preclude dislodgment by circulation of electrolyte, while at the same time a multitude of passage-ways are provided for the circulation of the latter through the battery elements and ample provision is made for ingress to and egress from all parts of the elements of electric currents in connection with conductors joined to the poles of the battery.

With these and other incidental objects in view the invention may be said to consist in a number of novel features of construction and combinations of parts, the essential elements of which are recited in the appended claims and preferred forms of embodiment of which are specifically described hereinafter and illustrated in the accompanying drawings, forming part of this specification.

Of the drawings, Figure 1 represents a storage battery with elements embodying the present invention, its containing vessel appearing in longitudinal section and its interior parts in side elevation. Fig. 2 represents this battery with the containing vessel in cross-section and its interior parts in end elevation. Fig. 3 represents an edge view of what may be termed a "battery element unit," illustrating a modification of the form of embodiment of the invention shown in Figs. 1 and 2. Fig. 4 represents a fragmentary side elevation of the structure shown in Fig. 3 on a greatly-enlarged scale and with lead formations exaggerated, and Fig. 5 represents a cross-section of the structure shown in Fig. 3 on the scale of Fig. 4.

In carrying out my invention I take pure desilverized lead-foil of extreme thinness and perforate the same freely, at the same time giving it a pebbled formation, preferably by a puncturing process, so that the lead-foil has alternating indentations and protuberances all over its surfaces, each with a perforation or puncture through its center, the perforations being so closely assembled as to practically reduce the lead-foil to a state of fine mesh. This prepared lead-foil may be employed in various ways for formative battery structure; but as here shown it is cut into strips, and these strips are superposed in sufficient numbers to fill the frames of the battery elements.

The invention embraces in addition to what is above described the coating of the lead-foil after it has been pebbled and perforated, red lead mixed with sulfuric acid being used for the positive-pole element and litharge mixed with sulfuric acid for the negative-pole element, and the coating in each case finds lodgment in the perforations of the lead-foil and in the indentations thereof, so that when the strips are superposed and united in the frames of the battery elements the active material provided by the coating of the lead-foil is secure against dislodgment by the circulatory action of the electrolyte, while at the same time the latter will find numerous passage-ways through the lead-foil structure, permitting practically unobstructed circulation.

For both forms of construction of battery elements shown in the drawings rectangular strips *a* of punctured and coated lead-foil are made up into compact blocks by superposing a considerable number of strips and pressing them together in a suitable mold, and these blocks are perforated at intervals from end to end transversely of the strips for a purpose hereinafter made clear, and a number of such blocks are used to fill the frame of each battery element. The coating applied as a paste over both sides of each strip prior to their being superposed will perform the function of a filler, preventing flattening of the pebbled lead-foil when the layers are pressed together.

In the construction shown in Figs. 1 and 2 each frame for a battery element is made of a single plate of lead with parallel rectangular openings $b$ and their bounding-strips $c$ twisted so as to stand at right angles to the top and bottom bars $c'$ and $c^2$ of the plate and form sides of compartments for the blocks of lead-foil strips. Long lead rivets $e$ extend through all of the bars $c$ of the frames and through the block-perforations, which are of slightly-smaller diameter than the rivets, so that sufficient force will be required in inserting the rivets to insure close contact between the latter and each individual lead-foil strip. The positive element of the battery is indicated in general by the reference-letter P and the negative element by the reference-letter N, the frame of the latter occupying a position between the two frames of the positive element and being separated therefrom by trusses $d$, of insulating material. Upstanding lead bars $f$ and $g$ are united to the said elements, respectively, and carry suitable binding-posts for connection with conducting-wires. The reference-letter $j$ designates the containing vessel of the battery, which is preferably made of glass, and $h$ designates blocks of insulating material, such as hard rubber, resting on the bottom of the said vessel and notched for engagement with the lower bars $c^2$ of the frames of the battery elements, which are thus spaced apart and separated from the bottom of the containing vessel.

Instead of employing a one-piece structure, such as shown in Figs. 1 and 2, for a battery-element frame, it may be composed of a number of sections, such as shown in Figs. 3, 4, and 5, each frame-section consisting of lead bars $i$, shaped to produce a rectangular inclosure for a block of lead-foil strips and interlocked at the ends by flange-joints $i'$, through which a number of such sections can be conveniently connected together to constitute a complete battery-element frame. Rivets $i^2$ are passed through the bars $i$ and through the lead-foil structure, as heretofore described with reference to Figs. 1 and 2.

It will be seen that a construction such as above described is well calculated to fulfil the objects primarily stated, for the lead of the formative structure is practically reduced to a state of mesh and the peculiarities of the structure provide for the lodgment therein of active material in contact with a great extent of lead surface, and this active material is so engaged with the lead-foil structure as to be incapable of dislodgment by circulatory action of the electrolyte, while at the same time numerous passage-ways exist for circulation of the electrolyte, so that there is no restriction in this regard and the battery will stand rapid charging. In this connection it is to be noted that the coating of active material applied to the lead-foil is very thin and that the strips stand perpendicularly in the battery, so that gases can rise between them without restriction. It will also be seen that the formative structure of the present invention is of such character that a much greater thickness of battery elements is made practicable than with constructions heretofore shown, and it follows that the invention has the great advantage of increasing the capacity of a storage battery without necessitating the enlargement of its dimensions. Furthermore, the manner of compounding the framework of the battery elements with the formative structure is such as to provide for direct-current connections between all parts of such structure and the conductors connected with the poles of the battery, so that there will exist no isolated parts of the formative structure.

It is of course to be understood that the invention herein disclosed is capable of embodiment in a great variety of ways differing more or less from the forms of embodiment I have chosen to illustrate and specifically describe in the present case, but without departing from the spirit and scope of the invention. Hence in the claims which follow essential elements are recited without limitation as to details of construction.

While the prepared strips of lead-foil, as shown in the drawings, are assembled in a number of groups or bundles occupying different sections of the frames, there might be no subdivision of frames, in which case there would be no such grouping or bundling of the strips; but they would be assembled in sufficient number to fill a frame from end to end. Instead of employing pure lead for the framework and rivets of the battery elements a mixture of lead and antimony may be advantageously used, the antimony forming, say, ten per cent. of the composition.

While I have designated the solid-lead conductors which pass through the frames and the lead-foil layers as "rivets," it is to be understood that this term embraces any form of lead core so disposed.

The coating of active material may be omitted and the battery elements made up with perforated lead-foil in superposed layers uncoated, leaving the formative process to be gone through with on the Planté principle.

Having thus described my invention, what I claim as new is as follows:

1. A storage-battery structure consisting of superposed layers of lead-foil having numerous punctured indentations each layer being entirely coated over both sides with active material.

2. A storage-battery element comprising a lead frame, superposed layers of perforated lead-foil filling the same, and one or more lead cores passing through the frame and the lead-foil layers.

3. A storage-battery element comprising a single-piece lead frame subdivided into sections by twisted bars between openings and superposed layers of perforated and pebbled lead-foil occupying said openings.

4. A storage-battery element comprising a single-piece lead frame subdivided into sections by twisted bars between openings, superposed layers of perforated and pebbled lead-foil occupying said openings, and lead rivets passing through the said bars and the lead-foil, substantially as described.

5. A storage-battery element comprising a lead frame subdivided by cross-bars, superposed layers of lead-foil occupying the subdivisions of the frame, and one or more solid-lead cores extending through the frame, cross-bars and the lead-foil layers.

In testimony whereof I have signed my name to this specification, in the presence of two subscribing witnesses, this 3d day of August, A. D. 1901.

JEROME REDDING.

Witnesses:
  FRANK PARKER DAVIS,
  RALPH W. BARTLETT.